(12) United States Patent
Salama

(10) Patent No.: US 11,571,644 B2
(45) Date of Patent: *Feb. 7, 2023

(54) CYCLONIC VEHICULAR TRAFFIC POLLUTION CONTROL SYSTEM

(71) Applicant: Imam Abdulrahman Bin Faisal University, Dammam (SA)

(72) Inventor: Khaled Fikry Salama, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/530,784

(22) Filed: Nov. 19, 2021

(65) Prior Publication Data

US 2022/0072458 A1    Mar. 10, 2022

Related U.S. Application Data

(63) Continuation of application No. 16/563,296, filed on Sep. 6, 2019, now Pat. No. 11,213,777.

(51) Int. Cl.
*B01D 46/00*      (2022.01)
*B01D 46/54*      (2006.01)
(Continued)

(52) U.S. Cl.
CPC ....... *B01D 39/1623* (2013.01); *B01D 46/546* (2013.01); *B01J 21/063* (2013.01);
(Continued)

(58) Field of Classification Search
CPC ...... B01D 46/10; B01D 46/546; B01D 45/12; B01D 2279/40; B01D 2239/025;
(Continued)

(56) References Cited

U.S. PATENT DOCUMENTS 5,432,000 A    7/1995    Young, Sr.
5,498,478 A    3/1996    Hansen
(Continued)

FOREIGN PATENT DOCUMENTS

CN    1276224 C    9/2006
CN    204723896 U    10/2015
(Continued)

OTHER PUBLICATIONS

Su, et al. ; Hierarchically structured TiO2/PAN nanofibrous membranes for high-efficiency air filtration and toluene degradation ; Journal of Colloid and Interface Science (2017) ; Jul. 28, 2017 ; 32 Pages.
(Continued)

*Primary Examiner* — Minh Chau T Pham
(74) *Attorney, Agent, or Firm* — Oblon, McClelland, Maier & Neustadt, L.L.P.

(57) ABSTRACT

A filter may remove $PM_{2.5}$ and/or other airborne pollutants, which filter has fibers of an average diameter of no more than 500 nm, the fibers of at least 90 wt. % polyacrylonitrile, relative to all fibers in the filter; and a catalyst of at least 90 wt. % $TiO_2$, relative to all catalytic metals in the filter, dispersed onto the fibers. The fibers need not be charged. The $TiO_2$ may be condensed or precipitated onto the fibers out of a liquid containing the $TiO_2$ and the fibers by simple methods. The catalyst may be activated by UV irradiation to decompose particulate matter having an average particle size of 2.5 μm or less, i.e., $PM_{2.5}$, and/or other airborne pollutants from air. Such filters may be implemented around areas of vehicle traffic, e.g., as elements of traffic lights, and may be used to controllably purify polluted air.

9 Claims, 11 Drawing Sheets

(51) Int. Cl.
  *B01D 45/12* (2006.01)
  *B01J 21/06* (2006.01)
  *F24F 8/99* (2021.01)
  *B01D 39/16* (2006.01)
  *F24F 8/10* (2021.01)
  *F24F 8/22* (2021.01)

(52) U.S. Cl.
  CPC ............ *F24F 8/10* (2021.01); *B01D 2279/40* (2013.01); *F24F 8/22* (2021.01); *F24F 8/99* (2021.01)

(58) Field of Classification Search
  CPC ..... B01D 2239/0258; B01D 2239/1233; B01J 21/063; F24F 8/22; F24F 8/99
  See application file for complete search history.

(56) References Cited

U.S. PATENT DOCUMENTS

| | | | | |
|---|---|---|---|---|
| 5,564,065 | A * | 10/1996 | Fleck | ............... B01J 35/002 55/385.2 |
| 11,213,777 | B2 * | 1/2022 | Salama | .................. F24F 8/167 |
| 2008/0264259 | A1 | 10/2008 | Leung | |
| 2012/0298319 | A1 | 11/2012 | Fujiwara | |
| 2014/0287230 | A1 | 9/2014 | Walls | |
| 2016/0051918 | A1 | 2/2016 | Walz | |
| 2016/0166959 | A1 * | 6/2016 | Cui | .................... B01D 39/1623 204/192.12 |

FOREIGN PATENT DOCUMENTS

| | | |
|---|---|---|
| CN | 104815483 B | 3/2017 |
| CN | 105371399 B | 7/2018 |
| CN | 109023727 A | 12/2018 |
| CN | 109107395 A | 1/2019 |
| KR | 10-0945311 | 3/2010 |

OTHER PUBLICATIONS

Su, et al.; Photocatalytic Process of Simultaneous Desulfurization and Denitrification of Flue Gas by TiO2-Polyacrylonitrile Nanofibers; Environmental Science and Technology (2013) 47(20); Sep. 11, 2013; Abstract Only; 1 Page.
Xiong, et al.; Sandwich-structured fibrous membranes with low filtration resistance for effective PM capture via one-step needleless electrospinning; Materials Research Express, vol. 6, No. 3; Dec. 19, 2018; Abstract Only; 2 Pages.
Zhang, et al.; Deciphering Effects of Surface Charge on Particle Removal by TiO2 Polyacrylonitrile Nanofibers; Aerosol and Air Quality Research, 17; pp. 1909-1916; 2017; 8 Pages.

* cited by examiner

CYCLONIC VEHICULAR TRAFFIC POLLUTION CONTROL SYSTEM

CROSS-REFERENCE TO RELATED APPLICATIONS

The present application is a Continuation of U.S. application Ser. No. 16/563,296, now U.S. Pat. No. 11,213,777, having a filing date of Sep. 6, 2019.

BACKGROUND OF THE INVENTION

Field of the Invention

The present disclosure relates to air purification devices and methods, particularly using $TiO_2$-coated fibers, which may have nanometer-scale average particulate and/or fiber diameters, and may be particularly useful in reducing the amount of airborne particulate matter of average particle size up to 2.5 μm ($PM_{2.5}$) and/or noxious and/or toxic pollutant gases in the air often generated in association with fossil fuel combustion.

Description of the Related Art

The potential health effects of exposure of human populations living near major roadways to certain air pollutants and toxins emitted from both gasoline and diesel engines are a growing concern. Recent toxicological and epidemiological studies have identified living near major roadways as a risk factor for respiratory and cardiovascular problems and other health related issues including asthma, allergic diseases, reduced lung function, reduced lung growth, low birth weight, pre-term newborns, lung cancer, and premature death. Particulate matter pollution has thus become a serious concern for public health.

Air quality depends on the various gases and particles present in the local environment. Both natural phenomena and human activities can affect the cleanliness of air.

In recent decades, many countries experienced unprecedented industrial growth. This industrial growth has improved the quality of life in these countries and regions while correspondingly increasing certain environmental health risks, particularly airborne pollution.

Recent epidemiological studies have indicated that the exposure to fine particulate matter, i.e., airborne particulate matter having a particle diameter up to 2.5 μm, or $PM_{2.5}$, is associated with increased cardiopulmonary morbidity and mortality. Some studies have indicated that levels of particulate matter are high in various industrial regions, including metropolitan areas throughout China, the United States, Europe, and greater India, as well as in Saudi Arabia and other regions of the Gulf. The airborne particulate issues in the GCC and particularly Saudi Arabia have mainly been attributed to rapid urbanization, vehicular traffic, industrialization, and an arid climate characterized by sand storms.

Airborne particulate matter pollution, left unmanaged, can seriously diminish quality of life, and it poses a serious public health threat as well as influencing visibility, direct and indirect radiative forcing, climate, and ecosystems. Airborne particulate matter is a complex mixture of extremely small particles and liquid droplets. Based on the particle size, airborne particulate matter is categorized, inter alia, as $PM_{2.5}$ with particle sizes up to 2.5 μm, or PM10, with particle sizes up to 10 μm. $PM_{2.5}$ pollution is particularly harmful since it can penetrate human bronchi and lungs owing to the small particle size. Long-term exposure to $PM_{2.5}$ increases morbidity and mortality.

Serious airborne particulate matter pollution problems have begun to present themselves in developing countries with large manufacturing industries and/or substantial localized fossil fuel combustion, such as Saudi Arabia. Air quality guidelines related to international comparative $PM_{2.5}$ pollution in a number of countries including Saudi Arabia are shown in FIG. 1. The complex compositions of airborne $PM_{2.5}$ pollution may include inorganic matter, such as $SiO_2$, $SO_4$, NO, and $NO_2$, and organic matter, such as organic carbon and elemental carbon, from diverse sources including soil dust, vehicular emission, coal combustion, secondary aerosols, industrial emission, and biomass burning.

$PM_{2.5}$ air pollution has accordingly become a widely studied air pollutant, associated with increased risk of cardiovascular disease, pulmonary disease, kidney disease, and other non-communicable diseases. $PM_{2.5}$ is believed to have contributed to about 4.2 million premature deaths in 2015. A growing body of evidence suggests an association between $PM_{2.5}$ pollution and the risk of diabetes. $PM_{2.5}$ concentration was suspected to be responsible for about 432,000 premature deaths in Europe in 2016.

Motor-vehicle emissions consist of a complex mixture of particulate and gaseous pollutants, including fine particulate matter, i.e., $PM_{2.5}$, or particles with a diameter no more than 2.5 μm, ultrafine particles, i.e., UFPs, or particles with a diameter no more than 0.1 μm, metals, organic material, black carbon (BC), volatile organic compounds (VOC), nitrogen oxides ($NO_x$, mostly NO and $NO_2$) and carbon monoxide (CO). While $PM_{2.5}$ and $NO_2$ are currently regulated as critical pollutants, UFPs are not specifically regulated despite having been shown to be toxic and have negative health impacts.

The behavior of PM pollution differs from other pollutants due to their chemical compositions, morphologies, and mechanical properties. Certain rigid inorganic PM pollutants are mainly captured by interception and impaction on a filter surface. Some soft PM containing carbon compounds and/or water, such as those from combustion exhaust, can deform on filter surfaces and require stronger binding during the process of attaching to the filter. Studies have focused on the surface properties of air filters to enhance PM particle capture. However, in existing air filter technology, insufficient effort has been invested in studying the properties of filter materials. There are essentially two types of air filters in common use. Certain efforts into filter improvements have been made in the art that warrant discussion.

CN 104815483 B and CN 204723896 U by Zhang et al. (Zhang) disclose a composite anti-microbial air filtration material. Zhang's electret fabric layer combines an electrospun fiber membrane layer, chitosan, and nano $TiO_2$ photocatalyst, and can remove $PM_{2.5}$ while having an anti-microbial, disinfectant, and odor removal function. Zhang's filtration material may be used in window curtains and screens, air-conditioners, air purifiers, and masks, to purify indoor air. While Zhang discloses an electrospun layer optionally made of polyacrylonitrile (PAN) among other choices, Zhang requires a chitosan layer and does not describe a PAN-fiber filter coated with $TiO_2$ for removing $PM_{2.5}$ particles from air.

CN 1276224 C by Fu et al. (Fu) discloses an adsorption air purifier with four parts: a casing, electronic dust collector, photocatalytic degrading unit, and negative ion generator. Fu's photocatalytic degrading unit comprises several UV lamps and an active carbon fiber-based photocatalytic $TiO_2$ material around the lamp tubes. Fu's air purifier relies on the active carbon fiber, the potential difference between the charged pollutant, and the grounded photocatalyst, to absorb airborne pollutant on the surface of the photocatalyst to promote the photocatalytic process. Fu's device can collect dust and photocatalytically degrade and ionize pollutants to improve air quality. Fu requires carbon fibers and ionization and does not describe a polymer (e.g., PAN) filter coated with $TiO_2$, nor does Fu expressly describe removing $PM_{2.5}$ particles.

CN 105371399 B by Liu et al. (Liu) discloses an air purifying device with a ventilating pipeline having an inlet and outlet, a purifying system, and a draft fan. Liu's purifying system has a purifying part arranged in the ventilating pipeline between the inlet and the outlet, the purifying part being manufactured from modified polyacrylonitrile fibers. Liu's device may use a UV lamp and photocatalyst layer such as $TiO_2$, but Liu's $TiO_2$ is on a glass fiber coating, not a polyacrylonitrile fiber. Also, Liu's polyacrylonitrile fibers are modified, Liu does not disclose a cyclone element or specifically removing $PM_{2.5}$ particles.

CN 109107395 A by Zhao et al. (Zhao) discloses a gas/air filter, its preparation, and applications. Zhao's air filter has a nanofibrous membrane of a high molecular weight polymer (PVB, PAN, PVP, PEO, PMMA, PMA, PA, etc.), made by electrostatic spinning, and a photochemical catalyst ($TiO_2$, ZnO, $W_{18}O_{49}$, $WO_3$, etc.) effective to filter out particulate pollutants such as $PM_{2.5}$ and $PM_{10}$ in air, applicable to air cleaning facilities such as screen windows, masks, and filter screens. Zhao's PAN is 150 kDa and Zhao does not particularly describe combining PAN and $TiO_2$, much less in a device or system comprising a cyclone, filter, pump, and UV emitter, nor one located close to vehicle traffic.

CN 109023727 A by Chen et al. (Chen) discloses a nanofiber membrane material for capturing $PM_{2.5}$ and its preparation, involving electrostatic spinning a nano composite fiber filter membrane and contacting the Chen's filter with particulate matter and PM2.5 in air polluted by cigarette smoke. Chen describes electrospinning a PAN/$TiO_2$ nano composite fiber filter membrane with to reduce $PM_{2.5}$ pollution, and Chen's fibers are charged.

KR 10-0945311 B1 by Jung (Jung) discloses a complex photocatalyst filter using visible rays and an air purifying device using the same to remove contaminated materials and bacteria from air. Jung uses a base material with a net body and a photocatalytic coating on the surface of the base material, suitable to decompose pollutants in the air. Jung's photocatalyst composition includes Rh, $TiO_2$, $V_2O_5$, $WO_3$, $K_2SIO_3$, and $PtCl_2$. Jung discloses visible light catalysts, and is silent about using polyacrylonitrile.

*J. Colloid Interf. Sci.* 2017, 507, 386-396 by Su et al. (Su-I) discloses nanoparticle-on-nanofiber composite membranes prepared by electrospraying $TiO_2$ suspensions and electrospinning a PAN solution simultaneously. Su-I's $TiO_2$ nanoparticles are dispersed on the surface of PAN nanofibers to construct hierarchical nanostructures, providing photocatalytic activity and filtering capabilities. Su-I's $TiO_2$ has an average particle size of 25 nm and Su-I estimates the amount of $TiO_2$ in its composite to be 4, 9, 13, and 22 wt. %.

*Environ. Sci. Technol.* 2013, 47(20), 11562-11568 by Su et al. (Su-II) discloses $TiO_2$ nanoparticles on electrospun PAN nanofibers via coupled electrospinning and hydrothermal synthesis. Su-II discloses a photocatalytic oxidation process for simultaneous desulfurization and denitrification of flue gas using its $TiO_2$-PAN photocatalyst. Su-II discloses a titanium loading of 6.78 at. % under UV light was proposed. Su-II does not describe removing $PM_{2.5}$ nanoparticles or a device including a cyclone, pump, and filter.

*Mater. Res. Express* 2019, 6(3), 035027 by Xiong et al. (Xiong) discloses air filters having electrospun nanofiber membranes with small pore size distribution for treating airborne particulate matter. Xiong's low filtration resistance sandwich structured PAN fibrous filters have controlled, accumulated, bimodal sized fibers, i.e., 172±21 nm and 772±118 nm. Xiong is silent about using $TiO_2$ and removing $PM_{2.5}$, CO, and nitrogen oxides.

*Aerosol Air Qual. Res.* 2017, 17(7), 1909-1916 by Zhang et al. (Zhang) discloses surface charged nanofibers, charged through corona discharge, to filter fine particles. Zhang describes 2.0% $TiO_2$ polyacrylonitrile fibers with up to 0.97 kV charge. Zhang's fibers are made by electrospinning and have no more than 2 wt. % $TiO_2$, and Zhang's filter relies on electrical charge. Zhang is silent on a cyclone, pump, and filter in its system.

In light of the above, a need remains for less complicated, yet still effective filter materials and methods, particularly for PAN-$TiO_2$ systems, and for simplified methods of making such materials, e.g., by solution-based coating.

SUMMARY OF THE INVENTION

Aspects of the invention provide methods for removing at least one airborne contaminant from polluted air. Such methods may comprise: passing polluted air comprising the at least one airborne contaminant through a cyclone to remove particles of at least 100 µm, to obtain cycloned air having less of the airborne contaminant than the polluted air; contacting the cycloned air with an uncharged filter under irradiation by ultraviolet (UV) light, to obtain a filtered air having less of the airborne contaminant than the cycloned air, wherein the filter comprises (i) fibers of an average diameter of no more than 500 nm, the fibers comprising at least 90 wt. % polyacrylonitrile, relative to all fibers in the filter, and (ii) a catalyst comprising at least 90 wt. % $TiO_2$, relative to all catalytic metals in the filter, dispersed onto the fibers, and wherein the at least one airborne contaminant comprises particulate matter having a particle size of 2.5 µm or less, CO, a volatile organic compound, a sulfur oxide, a nitrogen oxide, or a combination of two or more of any of these. Such methods may be modified by any feature or combination of features described herein in any permutation, particularly the following modifications.

The passing and/or the contacting may comprise drawing the polluted air with a pump. The passing and/or the contacting may be powered by photovoltaic energy, and the photovoltaic energy may further be stored in one or more batteries configured to the power the passing, contacting, and/or irradiation. Alternatively or additionally, the passing and/or the contacting may be powered by a municipal electrical power grid.

The $TiO_2$ on the fibers may have been precipitated onto the fibers while in a liquid phase with the fibers.

The irradiation may comprise directing a UV lamp at the filter and/or the irradiation may comprise sunlight.

Inventive methods may be conducted from a vehicular traffic signal, a street light, a static traffic sign, a mobile traffic sign, a divider, a mobile traffic barrier, a manhole cover, a sewer grating, a train level-crossing, a billboard, a telephone pole, a power pole, or two or more of any of these. Inventive methods may be conducted in a location with no access to municipal electrical power.

Aspects of the invention provide filters, comprising: fibers of an average diameter of no more than 500 nm, the fibers comprising at least 90 wt. % polyacrylonitrile, relative to all fibers in the filter; and a catalyst comprising at least 90 wt. % $TiO_2$, relative to all catalytic metals in the filter, dispersed onto the fibers, wherein the fibers are uncharged, wherein the $TiO_2$ is condensed onto the fibers out of a liquid comprising the $TiO_2$ and the fibers, and wherein the catalyst is activated by UV irradiation to decompose particulate matter having a particle size of 2.5 μm or less from air. Such filters may be modified by any feature or combination of features described herein in any permutation.

The $TiO_2$ may have an average particle diameter of no more than 24 nm, and/or the $TiO_2$ may be at least 50% anatase.

Inventive filters may be suitable to remove carbon monoxide, a volatile organic compound, a nitrogen oxide, a sulfur oxide, a further combustion exhaust gas, or a combination of two or more of these, from air.

Inventive filters may be configured to reject particles having a diameter greater than 300 nm.

Aspects of the invention provide air treatment systems, comprising: at least one inventive filter of any permutation described herein, mounted in a catalytically inactive frame; a cyclone configured to remove airborne particles having an average particle size of 100 μm or more; a UV source; and an electrical power source, wherein the filter is positioned to receive ultraviolet radiation from the UV source, and wherein the cyclone is operably connected to the filter. Such systems may be modified by any feature or combination of features described herein in any permutation.

Inventive systems may be ones in which the electrical power source comprises a battery and/or a photovoltaic cell.

Inventive systems may further comprise a pump, operably connected to the cyclone and the filter so as to move air through the cyclone and filter.

Aspects of the invention provide methods of synthesizing a particulate air filter material, which methods may comprise: contacting polyacrylonitrile fibers with an average diameter of no more than 500 nm with $TiO_2$ in a liquid; mechanically agitating the liquid comprising the fibers and the $TiO_2$; and/or removing liquid to provide the particulate air filter material comprising $TiO_2$ deposited upon the polyacrylonitrile fibers. The mechanically agitating comprises sonicating the liquid. Such methods may be modified by any feature or combination of features described herein in any permutation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
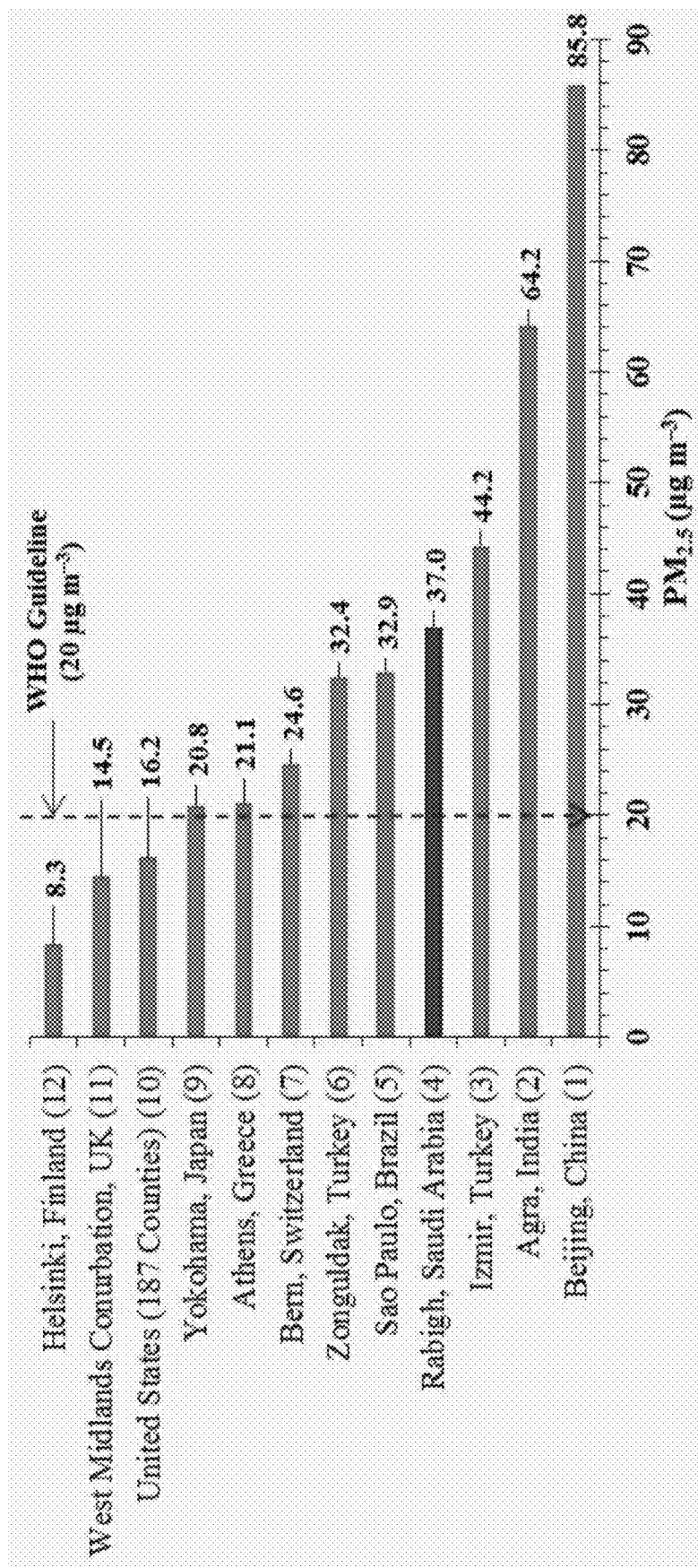
FIG. 1 shows comparative international $PM_{2.5}$ pollution in a number of countries including Saudi Arabia relative to suggested WHO air quality guidelines.

Aspects of the invention provide methods for removing at least one airborne contaminant from polluted air. Such methods may comprise: passing polluted air comprising the at least one airborne contaminant through a cyclone to remove particles of, e.g., at least 100, 90, 80, 75, 67, 60, 50, 40, 35, 30, 25, 20, 17.5, 15, 12.5, or 10 μm, to obtain cycloned air having less of the airborne contaminant than the polluted air; contacting the cycloned air with an uncharged filter under irradiation by ultraviolet (UV) light, to obtain a filtered air having less of the airborne contaminant than the cycloned air, wherein the filter comprises (i) fibers of an average diameter of no more than 500 nm, e.g., no more than 500, 475, 450, 425, 400, 375, 350, 333, 325, 315, 300, 285, 275, 267, 250, 233, 225, 215, 210, 205, or 200 nm, the fibers comprising at least 90 wt. % polyacrylonitrile, e.g., 90, 91, 92, 92.5, 93, 94, 95, 96, 97, 97.5, 98, 99, 99.1, 99.5, or 99.9 wt. % PAN (or even consisting essentially of—i.e., not having more than 5, 4, 3, 2.5, 2, 1, 0.5, 0.1, 0.01, 0.001, 0.0001, or 0.00001% monomers other than acrylonitrile), relative to all fibers in the filter, and (ii) a catalyst comprising at least 90 wt. % $TiO_2$, e.g., 90, 91, 92, 92.5, 93, 94, 95, 96, 97, 97.5, 98, 99, 99.1, 99.5, or 99.9 wt. % $TiO_2$, relative to all catalytic metals in the filter, dispersed onto the fibers, and wherein the at least one airborne contaminant comprises particulate matter having a particle size of 2.5 μm or less, e.g., no more than 2.5, 2.45, 2.4, 2.35, 2.33, 2.3, 2.25, 2.2, 2.15, 2.1, 2.05, or 2.0 μm and/or at least 0.1, 0.25, 0.5, 0.6, 0.7, 0.75, 0.8, 0.85, 0.9, 0.95, or 1 μm, CO (carbon monoxide), a volatile organic compound as described below, a sulfur oxide as described below, a nitrogen oxide as described below, or a combination of two or more of any of these. The passing and/or the contacting may comprise drawing the polluted air with a pump as described below. Generally, the pump may be arranged downstream of the filter in a system that is substantially or completely closed between the filter (housing) and the cyclone (housing), so as to urge gaseous fluid through the filtration system and expel purified gas (air) beyond the pump downstream of the filter.

The $TiO_2$ on the fibers may have been precipitated onto the fibers while in a liquid phase with the fibers. Rather than electrospraying the $TiO_2$, and/or affixing it to the PAN in any other way, the $TiO_2$ is preferably adsorbed to the surface of the PAN fibers from a liquid, e.g., suspension, colloid, or solution, of $TiO_2$ in a solvent (or liquid in which the $TiO_2$ is only partially soluble or insoluble).

Relevant solvents may include pyridine, N,N-dimethylformamide (DMF), N,N-dimethylacetamide, N-methyl pyrrolidone (NMP), hexamethylphosphoramide (HMPA), dimethyl sulfoxide (DMSO), acetonitrile, tetrahydrofuran (THF), 1,4-dioxane, dichloromethane, chloroform, carbon tetrachloride, dichloroethane, acetone, ethyl acetate, pet ether, pentane, hexane(s), cyclohexane, decane(s), decalin, THF, dioxane, benzene, toluene, xylene(s), o-dichlorobenzene, diethyl ether, methyl t-butyl ether, diisopropyl ether, ethylene glycol, methanol, ethanol, isopropanol, propanol, n-butanol, isobutanol, amyl alcohol, isoamyl alcohol, cyclopentanol, hexan-1-ol, hexan-2-ol, hexan-3-ol, 2-methylpentan-1-ol, 3-methylpentan-1-ol, 4-methylpentan-1-ol, 2-methylpentan-2-ol, 3-methylpentan-2-ol, 4-methylpentan-2-ol, 2-methylpentan-3-ol, 3-methylpentan-3-ol, 2,2-dimethylbutan-1-ol, 2,3-dimethylbutan-1-ol, 3,3-dimethylbutan-1-ol, 2,3-dimethylbutan-2-ol, 3,3-dimethylbutan-2-ol, 2-ethylbutan-1-ol, cyclohexanol, and/or water.

The irradiation may comprise directing a UV lamp at the filter and/or the irradiation may comprise sunlight, e.g., the filter may be exposed to direct sunlight (for example, with a glass, PC, or material otherwise transparent to UV) and/or indirect sunlight (for example, with a mirror system). Useful UV lamps may include a UV curing lamp, UV medium pressure lamp, UV low pressure lamp, UV amalgam lamp, filtered UV lamp, high intensity UV lamp, black-light UV lamps, UV germicidal lamp, UV-LED lamp, or a combination of 2, 3, 4, 5, 6, 7, . . . 10 or more of these. Relevant UV lamps may have a spectral output of 254 nm and be ozone-free, and/or may include standard low-pressure mercury lamps (ozone-generating) made of synthetic or natural quartz glass having spectral output at 365, 254, and/or 185 nm. Relevant UV lamps may have UV output that drops to 50% after 8,000 hours of operation, or provide up to 90% of the UVC output even after 16,000 hours of operation. UV lamps may have a UV efficiency of at least 25, 27.5, 30, 32.5, 35, 37.5, 40, 42.5, 45% or more. Relevant UV lamps may have emission wavelengths as described below (e.g., a range of 100, 125, 150, 175, or 200 nm to 400, 425, 450, 475, 500, 525, 550, 575, 600, 650, 700, 750, or 800 nm) and/or a power density of, e.g., at least 25, 50, 75, 80, 85, 90, 95, 100, 110, 117.5, 125, 133, 140, 150, 165, 175, 200, 250, 500, or 1000 $W/cm^2$ The passing and/or the contacting may be powered by photovoltaic energy, and the photovoltaic energy may further be stored in one or more batteries (1, 2, 3, 4, 5, 6, 7 . . . 10, etc.) configured to the power the passing, contacting, and/or irradiation. Alternatively or additionally, the passing and/or the contacting may be powered by a municipal electrical power grid. Batteries relevant for inventive systems and/or methods are generally rechargeable, and may include an aluminum-ion, carbon (single carbon or dual carbon), flow, vanadium redox, zinc-bromine, zinc-cerium, lead-acid (e.g., deep cycle, VRLA, AGM, gel, etc.), glass battery, lithium-ion (lithium ion lithium cobalt oxide (ICR), lithium ion manganese oxide (IMR), lithium ion polymer, lithium iron phosphate, lithium-sulfur, lithium-titanate, thin film lithium-ion, lithium ceramic), magnesium-ion, metal-air electrochemical cell (e.g., lithium air, aluminum-air, germanium air, calcium air, iron air, potassium-ion, silicon-air, zinc-air, tin air, sodium-air, beryllium air, etc.), molten salt, nickel-cadmium (e.g., nickel-cadmium battery vented cell type), nickel hydrogen, nickel-iron, nickel metal hydride (e.g., low self-discharge NiMH), nickel-zinc, organic radical, polymer-based, polysulfide bromide, potassium-ion, rechargeable alkaline, rechargeable fuel, sand, silicon air, silver-zinc, silver calcium, silver-cadmium, sodium-ion, sodium-sulfur, solid-state, super iron, UltraBattery®, and/or zinc ion batteries, or combinations of two or more of any of these.

Inventive methods may be conducted from a vehicular traffic signal, a street light, a static traffic sign, a mobile traffic sign, a divider, a mobile traffic barrier, a manhole cover, a sewer grating, a train level-crossing, a billboard, a telephone pole, a power pole, or two or more of any of these. Inventive filters, devices containing the filters, and/or systems containing these may be incorporated into a vehicular traffic signal, a street light, a static traffic sign, a mobile traffic sign, a divider, a mobile traffic barrier, a manhole cover, a sewer grating, a train level-crossing, a billboard, a telephone pole, a power pole, or two or more of any of these. That is, inventive systems, may be entirely or partially integrally installed into any of these traffic/transportation fixtures (including those described below), and/or at least partially included, at least partially, in a separate housing on or within 1000, 750, 500, 250, 150, 100, 75, 50, 45, 40, 35, 30, 25, 20, 15, 10, or 5 cm of such fixtures. Inventive methods may be conducted in a location with no access to municipal electrical power, i.e., in an isolated and/or remote location, e.g., distant from cities, off the grid, at high altitude, or otherwise inaccessible or relatively unapproachable. It may also be relevant to practice inventive methods and/or implement inventive systems in populated or otherwise non-remote areas at which cabling are undesirable.

Aspects of the invention provide filters, comprising: fibers of an average diameter of no more than 500 nm (e.g., any diameter described above or below), the fibers comprising at least 90 wt. % polyacrylonitrile (e.g., any weight percent described above or below), relative to all fibers in the filter; and a catalyst comprising at least 90 wt. % $TiO_2$ (e.g., any weight percent described above or below), relative to all catalytic metals in the filter, dispersed onto the fibers, wherein the fibers are uncharged, wherein the $TiO_2$ is condensed onto the fibers out of a liquid comprising the $TiO_2$ and the fibers, and wherein the catalyst is activated by UV irradiation to decompose particulate matter having a particle size of 2.5 μm or less (e.g., any diameter described above or below) from air.

The $TiO_2$ may have an average particle diameter of less than 25 nm or no more than 24, 23, 22, 21, 20, 19, 18, 17.5, 17, 16, or 15 nm. The $TiO_2$ may be at least 50, 60, 70, 75, 80, 85, 90, 91, 92, 92.5, 93, 94, 95, 96, 97, 97.5, 98, 99, 99.1, 99.5, or 99.9% anatase and/or no more than 50, 33, 25, 20, 15, 10, 7.5, 5, 2.5, 2, 1, or 0.1% rutile.

Inventive filters may be suitable to remove UFPM, $PM_{2.5}$, $PM_5$, $PM_{7.5}$, $PM_{10}$, carbon monoxide, a volatile organic compound (as described below), a nitrogen oxide (as described below), a sulfur oxide (as described below), a further combustion exhaust gas (as described below), or a combination of two or more of these, from air. Inventive filters may be configured to reject particles having a diameter greater than 300, 285, 275, 265, 250, 240, 233, 225, 220, 210, 200, 190, 180, 175, 170, 160, 150, 140, 130, 120, 110, or 100 nm.

Aspects of the invention provide air treatment systems, comprising: at least one inventive filter of any permutation described herein, mounted in a catalytically inactive frame; a cyclone configured to remove airborne particles having an average particle size of 100 μm or more; a UV source; and an electrical power source, wherein the filter is positioned to receive ultraviolet radiation from the UV source, and wherein the cyclone is operably connected to the filter.

Inventive systems may be ones in which the electrical power source comprises a battery (one or more as described above) and/or a photovoltaic (solar) cell. Relevant photovoltaic cells may include crystalline silicon, polysilicon, thin film solar cells, amorphous silicon, Cd—Te, CIGS (Cu—In—Ge—Se), mono-like-multi silicon (MLM), gallium arsenide (GaAs), etc., as well as multiple junction cells, such as GaInP/Si dual junction solar cells. If photovoltaic units are implemented in inventive methods and systems, the photovoltaic units (and/or the batteries) do not need to be located directly together with the filter(s), optional UV lamp(s), and/or cyclone(s), or even the pump. Photovoltaic and/or battery power sources may be fed by cables/lines distanced from the filter, etc., e.g., 10, 7500, 5000, 2500, 1000, 750, 500, 250, 100, 75, 50, 25, 15, 10, or 5 m away. Theoretically, the pump and/or the cyclone may be spaced from the filter by extended distances, e.g., independently 50, 40, 30, 25, 20, 25, 10, 9, 8, 7, 6, 5, 4, 3, 2, 1 m, though for practical reasons preferably not as far as power cables (e.g., due to increased potential for leaks in the lines).

Inventive systems may further comprise 1, 2, 3, 4, 5, etc. pump(s) as described herein, operably connected to the cyclone and the filter so as to move air through the cyclone and filter.

Aspects of the invention provide methods of synthesizing a particulate air filter material, which methods may comprise: contacting polyacrylonitrile fibers with an average diameter of no more than 500 nm with $TiO_2$ in a liquid; mechanically agitating the liquid comprising the fibers and the $TiO_2$; and/or removing liquid to provide the particulate air filter material comprising $TiO_2$ deposited upon the polyacrylonitrile fibers. The mechanically agitating comprises sonicating the liquid, e.g., for at least 10, 15, 20, 25, 30, 35, 45, 60, 120, or 150 minutes and/or no more than 300, 240, 180, 120, or 60 minutes. The sonication may be at 40±1, 2, 2.5, 3, 4, 5, 10, 15, 20, 25, or 30 KHz.

Inventive methods of making the filter material can avoid electrospinning and electrospraying completely, and inventive fibers/filters are configured to operate without a charge (uncharged or neutral). Inventive filters may include single layers of a single concentration, multiple layers of a single concentration, or multiple layers of varying concentrations. The concentration of $TiO_2$ on the PAN fibers may be, for example, at least 0.5, 1, 2.5, 3, 4, 5, 6, 7.5, 10, 12.5, 15, 17.5, 20, 22.5, 25, 30, or 33 wt. % and/or up to 50, 45, 40, 35, 33, 30, 27.5, 25, 22.5, 20, 17.5, 15, 14, 13, 12, 11, 10, 9, 8, 7, 6, or 5 wt. %. Inventive fibers and/or filters need not comprise chitosan (e.g., carboxylated chitosan-carboxymethyl chitosan, chitosan oligosaccharide, hyaluronic acid-like chitosan, chitosan salt—chitosan sulfate, chitosan hydrochloride, chitosan quaternary ammonium salt, chitosan lactate, chitosan glutamate, etc.) and/or polymers with amine side groups, or may comprise no more than 5, 4, 3, 2.5, 2, 1, 0.5, 0.1, 0.01, 0.001, 0.0001, or 0.00001 wt. %, relative to total fiber and/or filter weight, of such amine-containing polymers.

Inventive fibers and/or filters need not comprise polyethylene, polypropylene, modified polyacrylonitrile, polytetrafluoroethylene, hexafluoroethylene, polytrifluoroethylene, polyester, polyethersulfone, polysulfone, polyvinyl alcohol, polyethylene oxide, polylactic acid, polyacrylate, polymethacrylate, poly methyl methacrylate, polyurethane, polyvinylidene fluoride, polyamide, and/or polystyrene, or may comprise no more than 5, 4, 3, 2.5, 2, 1, 0.5, 0.1, 0.01, 0.001, 0.0001, or 0.00001 wt. %, relative to total fiber and/or filter weight, of such amine-containing polymers, either individually or cumulatively.

Inventive filters generally do not contain activate carbon, graphite, graphene, (active) carbon fibers and/or fullerenes, or may comprise no more than 5, 4, 3, 2.5, 2, 1, 0.5, 0.1, 0.01, 0.001, 0.0001, or 0.00001 wt. %, relative to total filter material weight, of such carbon materials, either individually or cumulatively.

Inventive devices do not require ion generators, and inventive filter materials are generally uncharged, e.g., have no or no more than one (1) charge per 100, 250, 500, 750, 1000, 2500, 5000, 10000, 25000 g/mol, or more of molecule/polymer. Inventive fibers generally do not include steel mesh, aluminum mesh, copper mesh, and/or glass fibers, or may comprise no more than 5, 4, 3, 2.5, 2, 1, 0.5, 0.1, 0.01, 0.001, 0.0001, or 0.00001 wt. %, relative to total fiber weight, of such inorganic meshes, either individually or cumulatively.

Aspects of the invention provide filters chemically treated with $TiO_2$ which can tolerate and/or remove, e.g., traffic exhaust smoke which may contain a variety of pollutant gases, including CO, $CO_2$, $NO_2$, $NH_3$, $SO_2$, NO, $N_2O$, $N_4O$, $N_2O_3$, $N_2O_4$, $N_2O_5$, $N(NO_2)_3$, $N_4O_6$, $O_3$, soot, partially combusted hydrocarbons, C, monoterpenes, SO, $SO_2$, $SO_3$, $S_7O_2$, $S_6O_2$, $S_2O_2$, peroxyacetyl nitrate ($C_2H_3NO_5$), ionic gases, such as dinitramide ($N(NO_2)_3^-$), nitrite ($NO_2^-$), nitrate ($NO_3^-$), trioxodinitrate ($N_2O_3^{2-}$), peroxonitrite ($ONO_2^-$), hyponitrite ($N_2O_2^{2-}$), nitroxylate ($NO^-$), nitronium ($NO_2^+$), nitrosonium ($NO^+$), and volatile organic compounds, such as benzene, toluene, xylenes, acrolein, aldehydes (e.g., formaldehyde, acetaldehyde, etc.), and polycyclic aromatic hydrocarbons, and convert them into $CO_2$ and water. Aspects of the invention include airborne $PM_{2.5}$ removal devices that may be less expensive and/or requiring less energy than those presently available. Aspects of the invention include airborne $PM_{2.5}$ removal devices that can be operated with solar energy, optionally further with storage batteries attached to such devices.

In inventive devices and/or methods, contaminated air may be drawn automatically through a filter and/or host space for catalyst, optionally using battery operated suction pump. Contaminated air may pass through the cyclone, i.e., dust sizing, which may be configured for dust of average particle diameter of 100 μm or more, and separation, and/or may allow for the passage of respirable dust, e.g., dust of average particle diameters ranging from 1 to 10 μm.

Fine and ultra-fine dust, including $PM_{2.5}$, may be passed to $TiO_2$ chemically treated polyacrylonitrile filter, or comparable material. The contact with $TiO_2$ may occur under UV-exposure, e.g., using one or more UV-lamps with specific power and/or wavelength(s), and/or from the sun. The irradiation of active $TiO_2$ photocatalysts may begin with an interaction of $TiO_2$ with $PM_{2.5}$ and/or other pollutants, e.g., toxic gases, in the presence of UV light, for example, from one or more irradiating UV light sources, whereby $PM_{2.5}$ and/or ultra-fine dust can be captured and adsorbed along the surface area of the $TiO_2$ filter, and substantially all (e.g., at least 75, 80, 85, 90, 91, 92, 92.5, 93, 94, 95, 96, 97, 97.5, 98, 99, 99.1, 99.5, or 99.9 wt. % of a total weight of such compounds in the inlet gas) toxic gases/pollutants can be broken down to non-toxic products, such as $CO_2$, water, and the like. Such a process can provide clean or at least cleaner air as exhaust/output out of the $TiO_2$ filter, e.g., by reducing the amount of one or more relevant pollutants to no more than 40, 33, 25, 20, 15, 10, 7.5, 5, 4, 3, 2, 1, or 0.5 wt. %, of their original amount(s), upon one cycle.

Inventive methods and devices may be operated at traffic signals, e.g., when the signal is red and automatically stopped when the traffic signal transformed to green alternatively, for example, at traffic intersections. The methods and/or devices may continuously operate, and/or be set to operate on particular schedules, such as peak traffic times. The system may use a municipal energy grid, and/or stored battery energy, which may be operated with a photovoltaic (solar) energy panel, e.g., located above the traffic signal. Inventive devices and methods may run without a battery on only solar energy during sunlit hours. The device may be installed in traffic signals at traffic intersections so as to operate (e.g., and stop) changeably with the ON and OFF the traffic signals.

$TiO_2$ has surprisingly exhibited efficient and effective results in reducing the concentration of $PM_{2.5}$ and toxic gases, substantially (independently, e.g., at least 75, 80, 85, 90, 92.5, 95, 97.5, 98, 99, 99.1, 99.5, or 99.9 mol. %) potentially completely reacting these with $TiO_2$-treated filters and substantially to completely (independently, e.g., at least 50, 60, 70, 75, 80, 85, 90, of 95, 96, 97, 98, 99, 99.5, or 99.9 mol. %) adsorb onto the nanoscale, large surface area $TiO_2$-containing filter, e.g., exploiting the photocatalytic power of $TiO_2$, preferably in presence of a source of UV light, such as sunlight and/or a UV lamp. Relevant UV light wavelengths may be, for example, at least 25, 50, 75, 100, 125, 150, 175, 200, 225, 250, 275, or 300 nm and/or up to 1000, 900, 800, 750, 700, 650, 600, 550, 500, 450, 400, 350, or 300 nm. The irradiation may use sunlight or an artificial light (e.g., from a lamp), including broad wavelength UV and/or visible light, e.g., from 10 to 1000 nm, or fractions thereof, such as ranges including endpoints selected from 100±5, 10, 20, 25, 30, 40, or 50, 200±5, 10, 20, 25, 30, 40, or 50, 300±5, 10, 20, 25, 30, 40, or 50, 400±5, 10, 20, 25, 30, 40, or 50, 500±5, 10, 20, 25, 30, 40, or 50, 600±5, 10, 20, 25, 30, 40, or 50, 700±5, 10, 20, 25, 30, 40, or 50, 800±5, 10, 20, 25, 30, 40, or 50, or 900±5, 10, 20, 25, 30, 40, or 50 nm.

By controlling the surface chemistry of the filters, the adhesion of and/or affinity to airborne particulate matter, e.g., by chemical class, size, polarity, electronegativity, neutrality, etc., can be tailored. In addition or separately, the nanostructure of the air filters can be configured to promote strong(er) surface adhesion, to increase the capture possibilities and/or modalities, to modify the air flux, and/or to render more effective the $TiO_2$ nano-particle chemically treated fiber (e.g., polyacrylonitrile) filters. Removal efficiencies of 90, 91, 92, 92.5, 93, 94, 95, 96, 97, 97.5, 98, 99, 99.1, 99.5, or 99.9%, calculated by comparing the number concentration before and after filtration) for $PM_{2.5}$ can be achieved, even under extreme hazardous air-quality conditions (e.g., 1, 1.25, 1.5, 1.75, 2, 2.25, 2.5, 2.75, 3, 3.5, 4, 5, 7.5, or 10-times the WHO guideline) in highly polluted traffic areas, particularly when the fiber diameter is decreased to the nanometer scale, under the same packing density. The particle-capture capability of inventive devices may be increased by increasing the surface area, i.e., by reducing fiber diameter while maintaining bulk density, which may ensure effective particulate matter, e.g., UFPM, PM 2.5, and/or $PM_{10}$, capture with thinner filters than conventional materials.

Aspects of the invention use filters chemically treated with $TiO_2$ for removing the $PM_{2.5}$ and/or other toxic gases/pollutants from contaminated air emission, for example, at traffic signals, intersections, along road fencing, at street lights, on telephone poles, in tunnel walls, along overpasses, along underpasses, on electrical (and/or other utility) boxes, on billboards, on facades adjacent to thoroughfares, on cell phone towers, at emergency telephone boxes, etc., or combinations of these.

Figure 3:
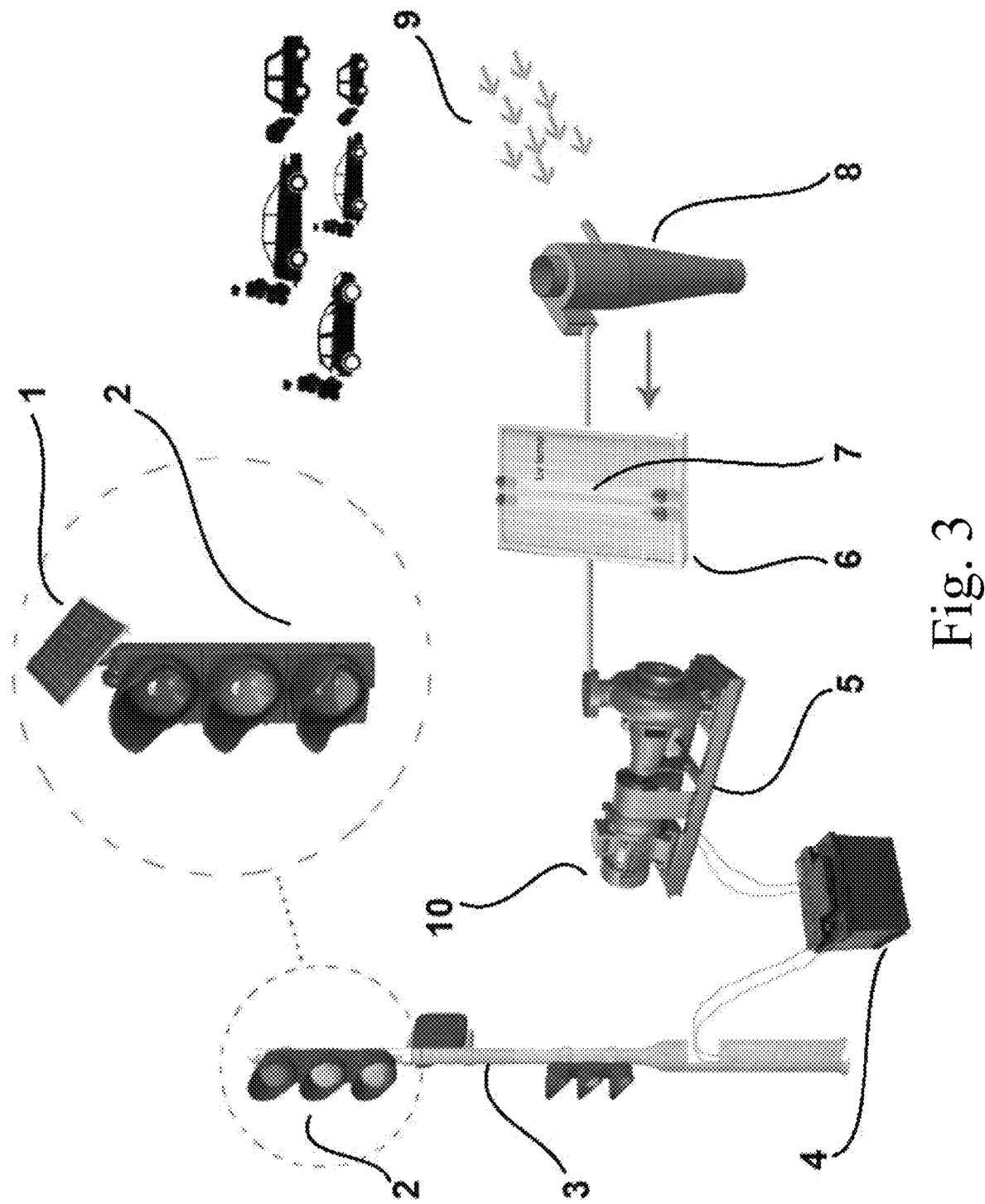
FIG. 3 shows an exemplary representation of elements of an implementation of the inventive filter system in a traffic signal setting.

Inventive filters may be subjected to chemical treatment and coating of different concentrations of $TiO_2$ on the filter to achieve desired nanoscale surface area coverage on the filter, so as to enable them to act as removers for, e.g., UFPM, $PM_{2.5}$, $PM_{10}$, soot, partially combusted hydrocarbons, nitrogen oxides, sulfur oxides, VOCs, and/or other toxic gases, from contaminated air as shown in the an exemplary design in FIG. 3.

Inventive devices, configured to remove, e.g., $PM_{2.5}$ and/or other toxic/pollutant gases, may be less expensive, may use less energy, may be operated with storage batteries, may be operated from solar energy, e.g., photovoltaic panel(s), and/or the $TiO_2$-treated filter may be manufacturing locally by a straightforward process. Inventive devices may be highly efficient for $PM_{2.5}$ and/or for all toxic gases exhausted from traffic and motor vehicle combustion. Such devices may be configured to be selective, e.g., for $PM_{2.5}$ relative to $PM_{10}$, $PM_{2.5}$ relative to UFPM, $PM_{2.5}$ relative to polar pollutants, and/or $PM_{2.5}$ relative to charged and/or uncharged pollutants. Inventive devices can be used indoor and/or outdoor, e.g., for air purification, to reduce health risks from $PM_{2.5}$ and/or other toxic gas exposures. Inventive devices may be used as separate air cleaning units, e.g., to remove vehicle emissions from the vehicle exhaust prior to emission into the environment.

Potential applications for inventive devices and methods include industrial environments, such as coal-fired, gas, and/or oil-fired power plants, waste combustion plants, incinerators, cement plants, asphalt plants, refineries, MTO facilities, MTG facilities, crackers, Fischer-Tropsch reactors, etc., in traffic emissions control, such as signage, street lights, traffic signals, billboards, window frames, utility modules, sewer systems (manholes, etc.), crossing signals, speaker systems (e.g., at crossings), facades, tree-mounted fixtures, dividers, walls, overpasses, underpasses, sensors, speed detectors, etc., indoor environments, such as in ventilators, cooling ducts, heating ducts, doors, window sills, etc.

Forms of $TiO_2$ useful in inventive materials may have an average particle diameter of at least 0.5, 1, 1.5, 2, 2.5, 3, 3.5, 4, 4.5, 5, 6, 7, 7.5, 8, 9, 10, 12.5, or 15 nm and/or up to 50, 45, 40, 35, 30, 25, 24, 23, 22.5, 22, 21, 20, 19, 18, 17.5, 17, 16, 15.5, or 15 nm.

Useful $TiO_2$ may have a BET surface area of, e.g., at least 10, 15, 20, 25, 30, 35, 40, 45, 50 $m^2/g$ and/or up to 150, 140, 133, 125, 120, 115, 110, 105, 100, 95, 90, 85, 80, 75, 70, 65, 60, 55, or 50 $m^2/g$. The $TiO_2$ may have a density of, e.g., at least 3, 3.25, 3.5, 3.75, 3.775, 3.8, 3.825, 3.85, 3.875, 3.9, 3.925, or 3.95 $g/cm^3$ and/or up to 4.5, 4.4, 4.33, 4.25, 4.2, 4.15, 4.1, 4.05, 4.0.25, 4, 3.975, 3.95, 3.925, 3.9, 3.875, 3.85, 3.825, 3.8, or 3.75 $g/cm^3$.

Useful $TiO_2$ materials may have a bulk density of, e.g., at least 0.025, 0.0275, 0.03, 0.0325, 0.0333, 0.034, 0.035, 0.036, 0.037, 0.038, 0.039, 0.0395, 0.04, 0.0405, 0.041, 0.042, 0.043, 0.044, 0.045, 0.046, 0.047, 0.0475, 0.048, 0.049, or 0.05 $g/cm^3$ and/or up to 0.07, 0.069, 0.068, 0.067, 0.066, 0.065, 0.064, 0.0633, 0.0625, 0.062, 0.061, 0.06, 0.059, 0.058, 0.057, 0.056, 0.055, 0.054, 0.053, 0.052, 0.051, or 0.05 $g/cm^3$.

Useful $TiO_2$ may be at least 50, 60, 70, 75, 80, 85, 90, 92.5, 95, 97.5, 99, or 99.5 wt. % in anatase form.

Useful $TiO_2$ may be no more than 40, 33, 25, 20, 15, 10, 7.5, 5, 4, 3, 2, 1, or 0.5 wt. % in rutile form.

Useful polyacrylonitrile materials may include those having an average diameter of, e.g., at least 25, 50, 75, 100, 125, 150, 175, 185, 190, 195, 200, 205, 210, 215, 220, 225, 230, 235, 240, 245, or 250 nm and/or up to 1000, 750, 600, 500, 450, 400, 375, 350, 325, 300, 275, 250, 225, 220, 215, 210, 205, 200, 195, 190, 185, 180, or 175 nm, and the fiber network may be suitable to filter out particles above 250, 240, 230, 225, 220, 215, 210, 205, 200, 195, 190, 185, 180, 175, 165, 150, 125, 100, or 75 nm.

Useful PAN materials may have a Mn of, e.g., at least 25, 50, 60, 70, 75, 80, 85, 90, 95, 100, 105, 110, 115, 120, 125, 133, 140, 150, 175, or 200 kDa and/or up to 800, 700, 600, 500, 450, 400, 350, 300, 250, 200, 175, 150, 145, 140, 135, 130, 125, 115, or 100 kDa. Useful PAN powders/materials may have a polydispersity index (PDI) of, e.g., at least 1.01, 1.025, 1.05, 1.1, 1.15, 1.2, 1.25, 1.33, 1.4, 1.45, 1.5, 1.6, 1.75, 1.85, 2, 2.25, 2.5, or 3 and/or up to 10, 7.5, 6.5, 5.5, 5, 4.5, 4, 3.75, 3.5, 3.25, 3, 2.75, 2.5, 2.25, 2, 1.9, 1.85, 1.8, 1.75, 1.7, 1.65, 1.6, 1.55, 1.5, 1.45, 1.4, 1.35, or 1.3. The polymer's molecular weight distribution may be monomodal, bimodal, trimodal, tetramodal, etc.

Useful PAN materials are generally not modified, e.g., carboxylated, aminated, partially reduced, or the like.

EXAMPLES

Inventive filter materials may be prepared by a method as follows. 2.8 gm of Polyacrylonitrile (PAN) fibers (CAS No. 25014-41-10) obtained from Sigma Aldrich, 181315, average Mw: 150,000 g/mol, density 1.184 g/mL at 25° C. (lit.) and with a polydispersity index (PDI Mw/Mn): 1.07, with low Melt flow index (MFI) are contacted with a solvent, such as isopropyl alcohol (Fisher Scientific, USA), in a solution comprising $TiO_2$ nanoparticles (nano powder of titanium dioxide—titanium(IV) oxide anatase nano powder, 99.7% purity, lot #13177E0801, UFC Biotechnology, USA). The $TiO_2$ used had an average particle size less than 21 nm. The exemplary nano $TiO_2$ solutions had concentrations of 5 mg/mL, 10 mg/mL, and 15 mg/mL.

Figure 4:
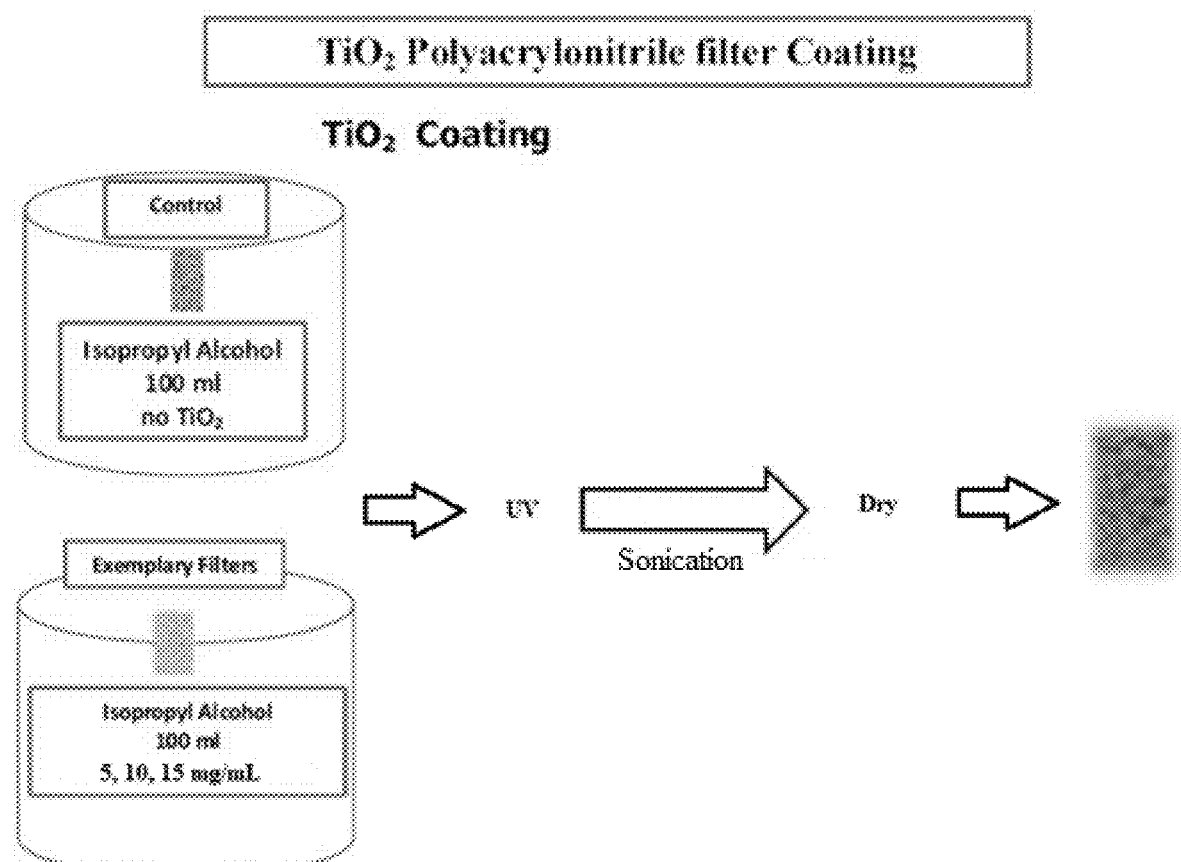
FIG. 4 shows a schematic flowchart of a preparation of exemplary filter fibers prepared with solutions of 5 mg/mL, 10 mg/mL and 15 mg/mL $TiO_2$ versus a control (no $TiO_2$)

The coated fibers were then irradiated with UV light 365 nm to coat the nanoscale $TiO_2$ onto the nanoscale polyacrylonitrile (PAN) fibers, as depicted in FIG. 4.

Then all solutions/suspensions were sonicated at 40 KHz for 30 minutes and left to dry at 55° C. for 1 hour.

Nano-filters were installed onto the sampling filter area and subsequently irradiated with UV light prior to use. The nano-filters were continuously irradiated with UV light during the sampling time.

The nano-filter fibers may be coated with $TiO_2$ such that (on the macroscopic surface area of the fibers) at least 40, 50, 65, 75, 80, 85, 90, 91, 92, 92.5, 93, 94, 95, 96, 97, 97.5, 98, 99, 99.1, 99.5, or 99.9% of the filter surface area is covered with $TiO_2$, as is shown in the scanning electron microscope (SEM) image on the right of FIG. 4.

Tests were conducted, sampling air emissions at traffic intersections during red lights at sampling flow rate of 10 L/minute and the concentration levels of pollutants in inlet air and outlet air, i.e., after contact with an inventive nanofibrous polyacrylonitrile filter under UV irradiation, and $PM_{2.5}$ and toxic gases in the air samples were analyzed.

Data obtained from the and SEM images of untreated and treated nanofiber polyacrylonitrile (PAN) filters are disclosed in FIGS. 5 to 7D, as well as in Tables 1 and 2 below.

Referring now to the drawings, wherein like reference numerals designate identical or corresponding parts throughout the several views.

FIG. 1 shows an international comparison of certain locations or national averages for air pollution relative to the World Health Organization (WHO) guideline for airborne pollution concentration limits, i.e., 20 μg/m$^3$.

Figure 2:
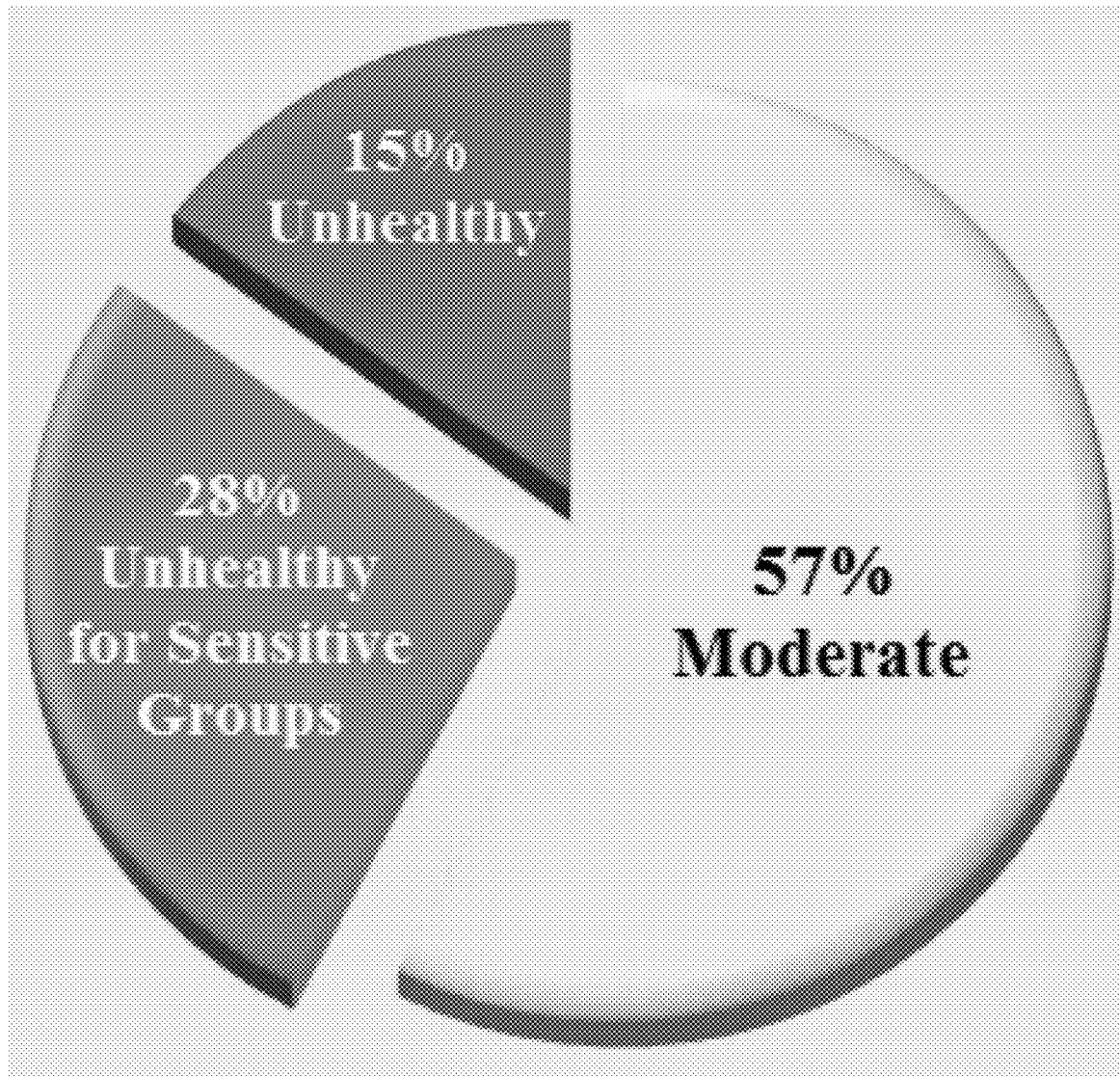
FIG. 2 shows an exemplary percent composition of polluted air by harmfulness to the general population.

FIG. 2 shows a percentage breakdown of the composition of typical pollutants in the air and their effect on the human population by severity.

FIG. 3 shows an exemplary implementation of inventive filter materials, depicting an exemplary photovoltaic cell/collector (1) atop a traffic signal (2), a battery (4) that may be placed within the pole (3) hosting the traffic signal (2). An exemplary pump arrangement is driven by the battery (4), whereby the pump (5) is electrically connected to the battery (4), and the pump (5) draws polluted air (9) from right to left through a cyclone particle separator (8), then the filter (6), and out through the exhaust (10) of the pump (5) back into the environment.

In the arrangement depicted in FIG. 3, the electrical power (4) is provided by a battery (4) attached to the photovoltaic cells (1), though the air draw may be powered by the photovoltaic cells (1), the municipal and/or local power grid (not numbered), any kind of battery system (e.g., 5), or a combination of these.

In the arrangement depicted in FIG. 3, the filter material (6) is hosted within a frame or cartridge upon which UV lamps (5) are mounted. The UV source may, however, be sunlight and/or some artificial source of UV. Relevant pumps (5) useful in arrangements according to the invention may be oil pumps, piezoelectrically driven pumps, rotary lobe pumps, progressing cavity pumps, rotary gear pumps, piston pumps, diaphragm (membrane) pumps, screw pumps, gear pumps, vane pumps, peristaltic hose, (vertical and/or horizontal) centrifugal pumps, etc., or combinations of these. The pump may be directly powered by a solar cell, by a battery, and/or off the municipal grid.

FIG. 4 shows a schematic representation of a manner of synthesizing inventive $TiO_2$-containing filter materials, illustrating a control (above) being placed in a solvent and exemplary filter fibers being placed in solvent containing selected amounts of $TiO_2$. The fiber-$TiO_2$ suspensions are then sonicated for a period of time to ensure mixing/dispersion, e.g., at least 5, 10, 15, 20, 25, 30, 40, 45, 60, or 90 minutes and/or up to 120, 105, 90, 75, 60, 45, or 30 minutes. After drying, a $TiO_2$-coated polymer (e.g., PAN) fiber filter material is obtained.

Figure 5:
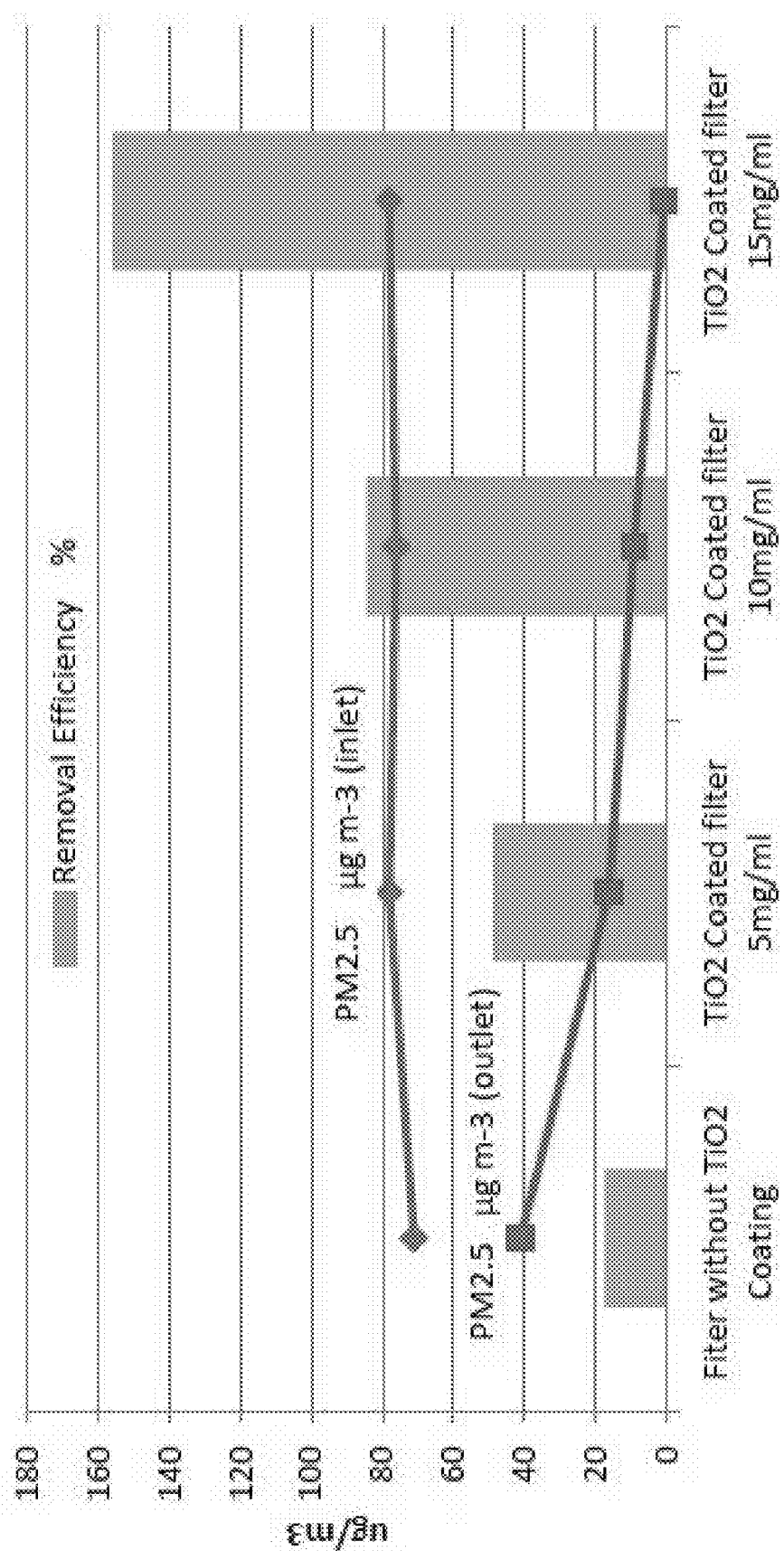
FIG. 5 shows a comparative chart of $PM_{2.5}$ removal by a control filter and exemplary filters having polyacrylonitrile fibers coated with different $TiO_2$ nanoparticle concentrations.

FIG. 5 shows experimental results with the exemplary $TiO_2$-coated polymer (e.g., PAN) fiber filters on polluted air containing $PM_{2.5}$. The numerical data behind FIG. 5 is also presented below in Table 1.

TABLE 1

| $PM_{2.5}$ removal by PAN filter coated with different $TiO_2$ concentrations. | | | |
|---|---|---|---|
| Filter Coating | inlet $PM_{2.5}$ (μg/m$^3$) | outlet $PM_{2.5}$ (μg/m$^3$) | Removal Efficiency % |
| no $TiO_2$ | 71 | 41 | 17.3 |
| 5 mg/mL $TiO_2$ | 78 | 16 | 48.7 |
| 10 mg/mL $TiO_2$ | 76 | 9 | 84.4 |
| 15 mg/mL $TiO_2$ | 78 | 0.5 | 156 |

Figure 6:
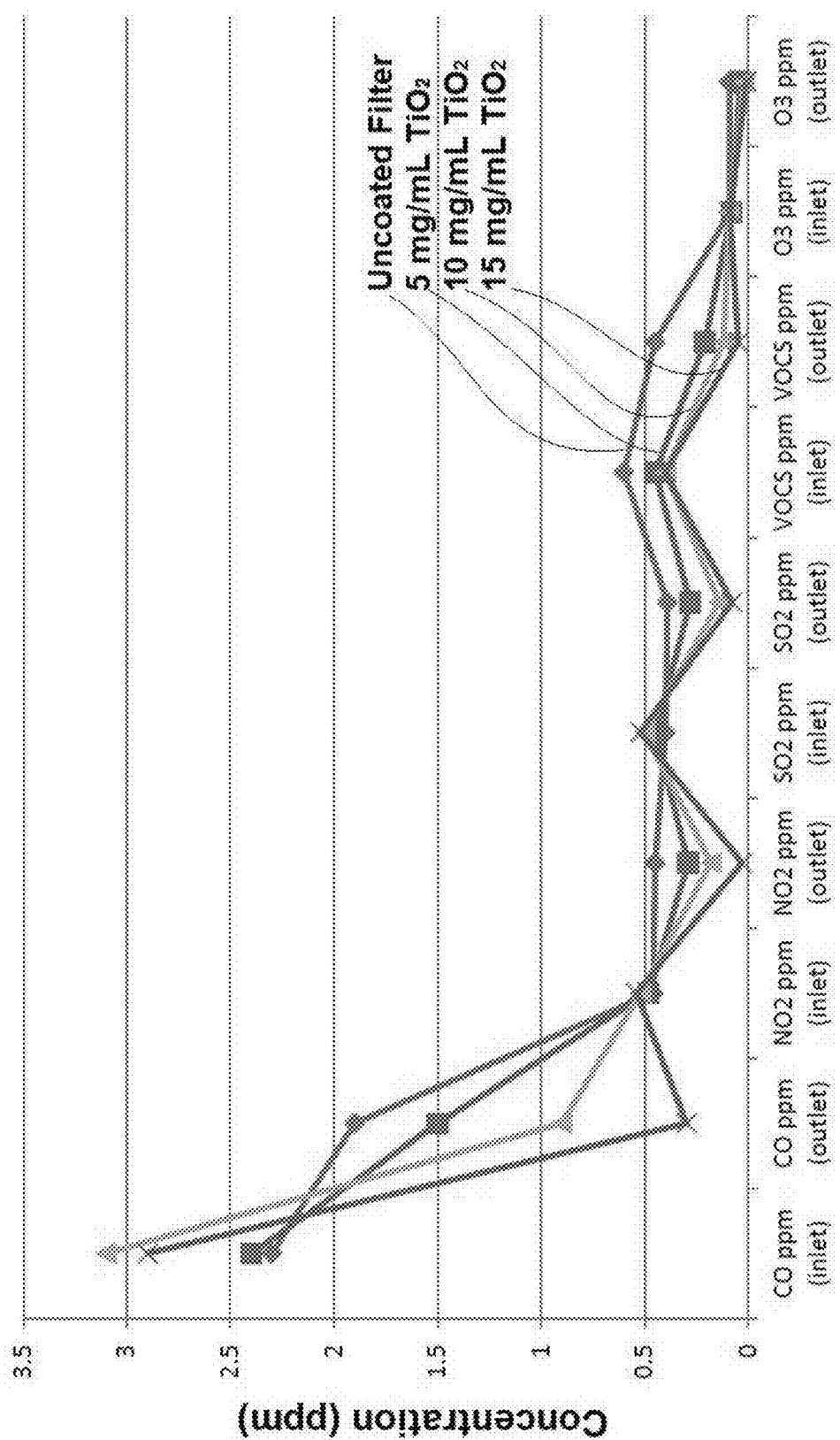
FIG. 6 shows a comparative plot of toxic gaseous air pollutants removal by a control filter and exemplary filters having polyacrylonitrile fibers coated with different $TiO_2$ nanoparticle concentrations.
Figure 7A:
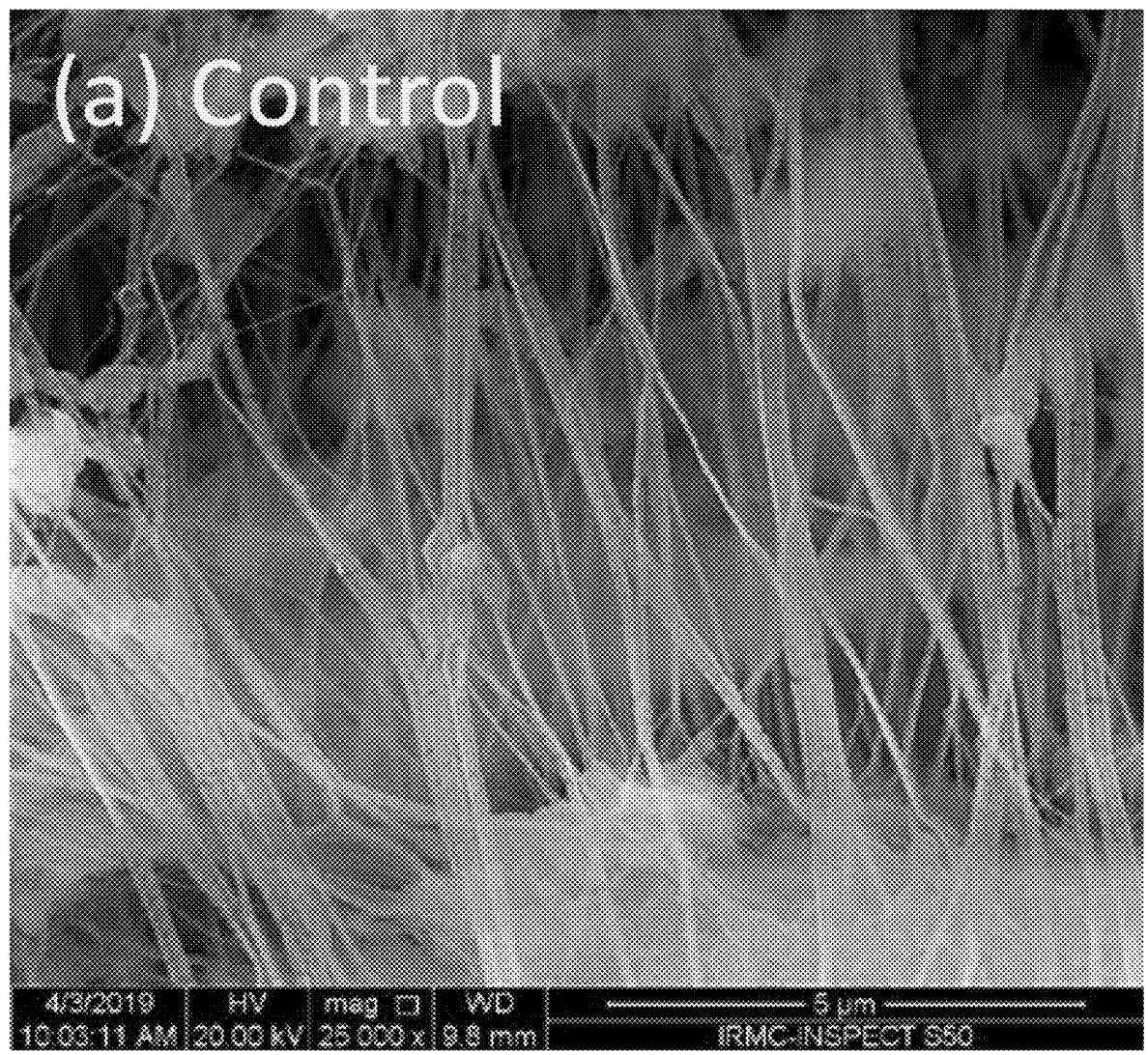
FIG. 7A shows a scanning electron microscope (SEM) image of a control filter having polyacrylonitrile (PAN) fibers and no $TiO_2$ on a 5 μm scale.
Figure 7B:
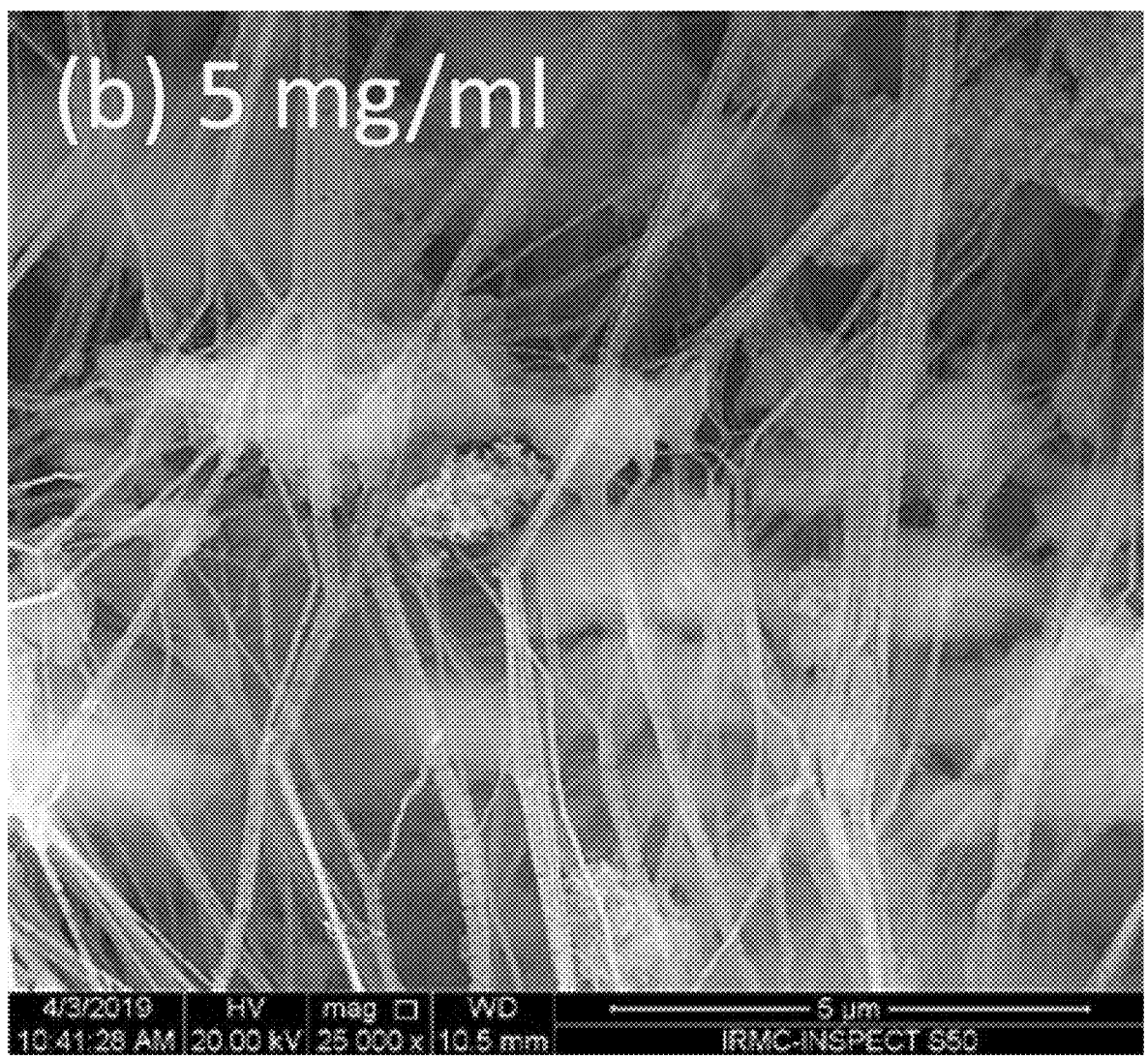
FIG. 7B shows an SEM image of an exemplary inventive filter having PAN fibers coated with 5 mg/mL $TiO_2$ on a 5 μm scale.
Figure 7C:
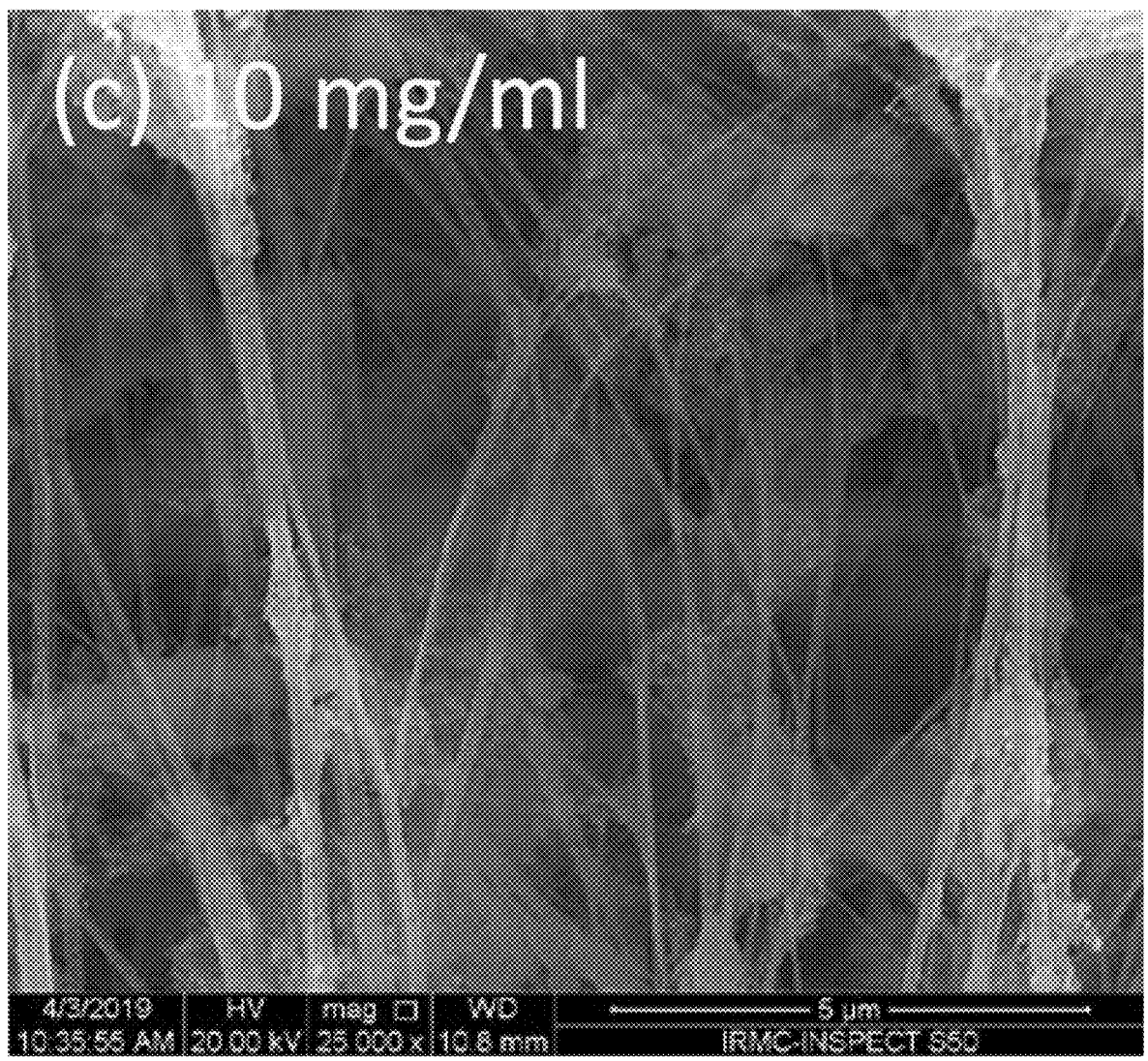
FIG. 7C shows an SEM image of an exemplary inventive filter having PAN fibers coated with 10 mg/mL $TiO_2$ on a 5 μm scale.
Figure 7D:
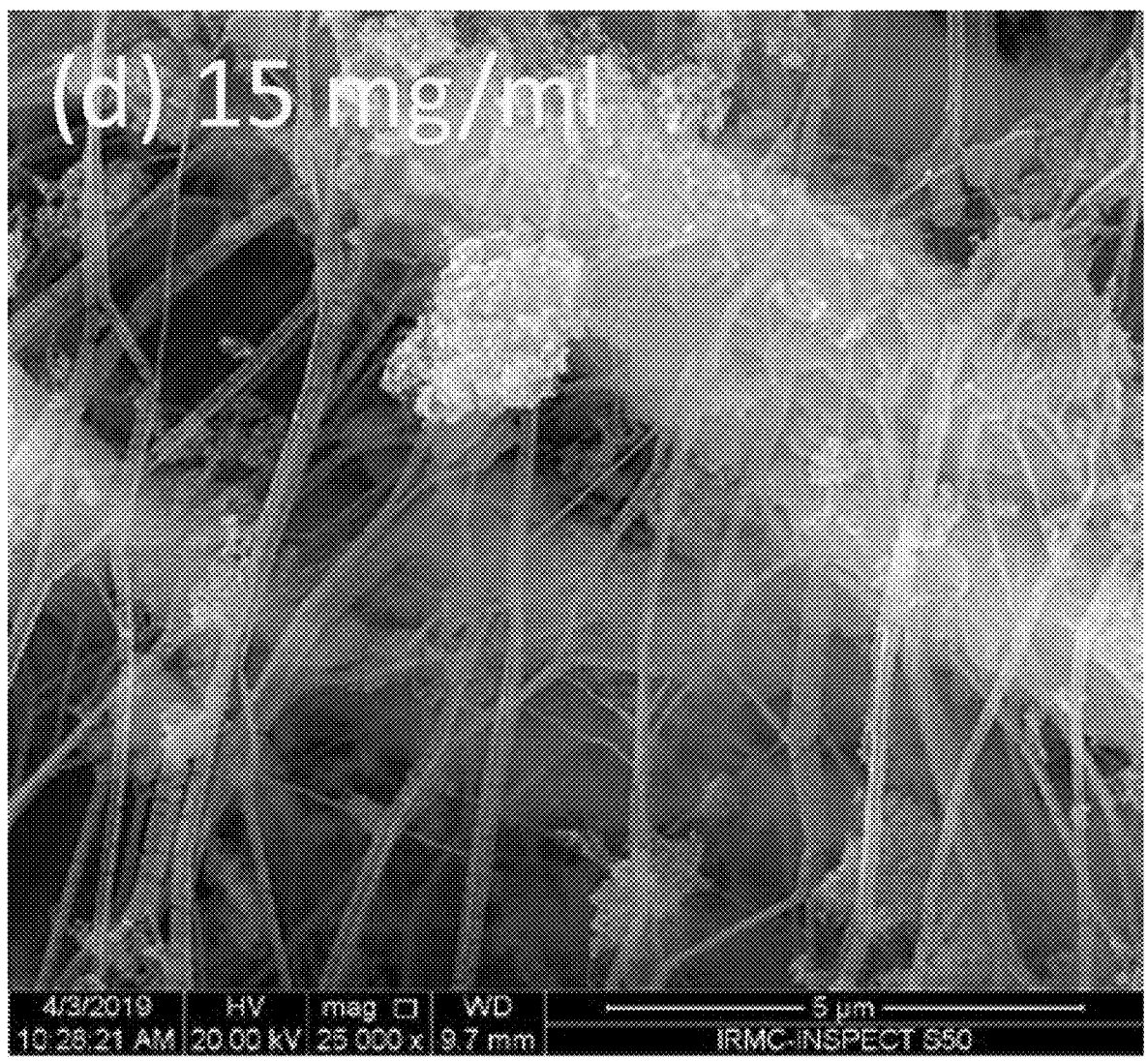
FIG. 7D shows an SEM image of an exemplary inventive filter having PAN fibers coated with 15 mg/mL $TiO_2$ on a 5 μm scale.
Figure 8:
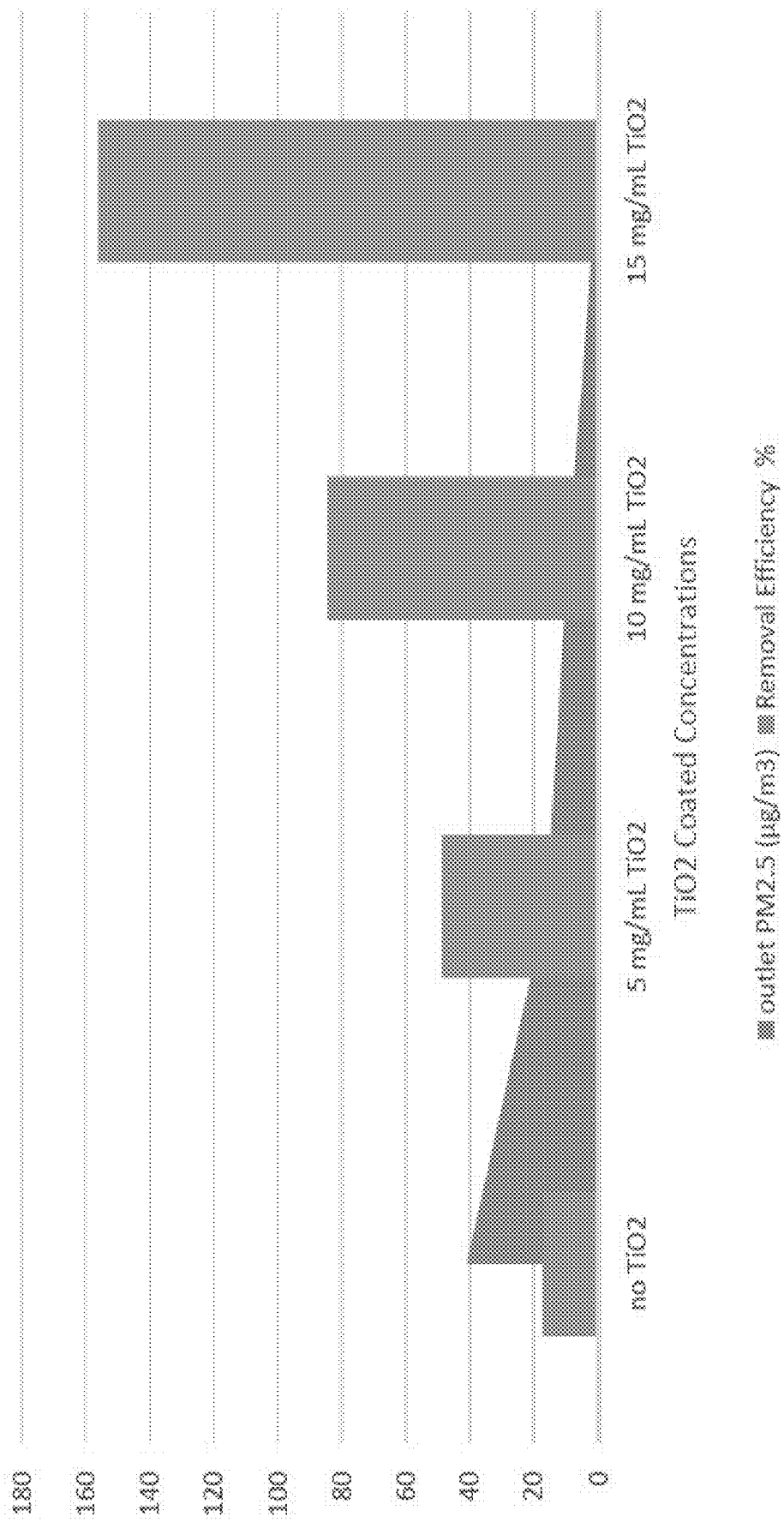
FIG. 8 shows $PM_{2.5}$ removal efficiency for different $TiO_2$ nanoparticle concentrations.

FIG. 6 shows experimental results with the exemplary $TiO_2$-coated polymer (e.g., PAN) fiber filters on polluted air containing carbon monoxide (CO), nitrogen dioxide ($NO_2$), sulfur dioxide ($SO_2$), volatile organic compounds (VOCs), and ozone ($O_3$). The numerical data behind FIG. 6 is also presented below in Table 2.

TABLE 2

Toxic gaseous air pollutant removal by exemplary $TiO_2$-coated PAN filters

| Filter Coating | CO ppm (inlet) | CO ppm (outlet) | $NO_2$ ppm (inlet) | $NO_2$ ppm (outlet) | $SO_2$ pm (inlet) | $SO_2$ ppm (outlet) | $VOC_S$ ppm (inlet) | $VOC_S$ ppm (outlet) | $O_3$ ppm (inlet) | $O_3$ ppm (outlet) |
|---|---|---|---|---|---|---|---|---|---|---|
| no $TiO_2$ | 2.3 | 1.9 | 0.46 | 0.45 | 0.4 | 0.39 | 0.6 | 0.45 | 0.09 | 0.091 |
| 5 mg/mL $TiO_2$ | 2.4 | 1.5 | 0.48 | 0.29 | 0.45 | 0.28 | 0.45 | 0.21 | 0.081 | 0.04 |
| 10 mg/mL $TiO_2$ | 3.1 | 0.9 | 0.52 | 0.18 | 0.5 | 0.14 | 0.4 | 0.12 | 0.091 | 0.02 |
| 15 mg/mL $TiO_2$ | 2.9 | 0.3 | 0.54 | 0.03 | 0.52 | 0.08 | 0.4 | 0.05 | 0.09 | 0.009 |

FIG. 7A to 7D show scanning electron microscope (SEM) images of a control PAN-fiber filter material (FIG. 7A) and an exemplary inventive PAN-fiber filter material treated with 0.5 mg/mL $TiO_2$ in isoamyl alcohol (FIG. 7B), an exemplary inventive PAN-fiber filter material treated with 10 mg/mL $TiO_2$ in isoamyl alcohol (FIG. 7C), and an exemplary inventive PAN-fiber filter material treated with 15 mg/mL $TiO_2$ in isoamyl alcohol (FIG. 7D) on 5 μm scale.

The SEM images disclose increasingly more densely coated nanofibers having $TiO_2$ deposits on their surfaces.

Useful fibers may have average diameters of, e.g., at least 5, 10, 25, 33, 45, 50, 60, 65, 70, 75, 80, 85, 90, 95, 100, 115, 125, 133, 150, 165, 175, or 200 nm and/or up to 1000, 750, 500, 450, 400, 350, 300, 275, 250, 225, 200, 175, or 150 nm. Agglomerations of $TiO_2$ on the fibers may have an average diameter of, e.g., 100, 150, 200, 250, 300, 350, 400, 500, or 750 nm and/or up to 2000, 1750, 1600, 1500, 1400, 1350, 1300, 1250, 1200, 1150, 1100, 1050, 1000, 950, 900, 850, 800, or 750 nm.

The $TiO_2$ agglomerations may be distributed along the length of the fibers, on average, at least every 0.25, 0.5, 0.75, 1, 1.25, 1.5, 1.75, 2, 2.25, 2.5, or 2.75 μm and/or up to 5, 4.5, 4, 3.75, 3.5, 3.25, 3, 2.75, 2.5, 2.25, 2, 1.75, or 1.5 μm.

Numerous modifications and variations of the present invention are possible in light of the above teachings. It is therefore to be understood that within the scope of the appended claims, the invention may be practiced otherwise than as specifically described herein.

REFERENCE SIGNS 1 photovoltaic cells
2 traffic signal
3 pole
4 power source, e.g., battery
5 pump
6 $TiO_2$-containing filter
7 UV source, e.g., lamp(s)
8 cyclone
9 polluted ($PM_{2.5}$ containing) air
10 treated ("clean") air

The invention claimed is:

1. A cyclonic vehicular traffic pollution control system, comprising:
a cyclone having an intake for the vehicular traffic pollution and an output for cycloned air, and a particle filter that is irradiated by a UV source;
a power source comprising a solar power collector mounted on a pole, said solar power collector being electrically connected to a battery contained within the pole; and
an air treatment system connected to the battery and contained within the traffic pole, wherein the air treatment system comprises a pump and the cyclone,
wherein the particle filter comprises uncharged polyacrylonitrile fibers having an average diameter of no more than 500 nm coated with a layer of anatase $TiO_2$ nanoparticles applied by contacting under sonication the polyacrylonitrile fibers with a solution of an alcohol and the anatase $TiO_2$ nanoparticles and then drying the polyacrylonitrile fibers, wherein the anatase $TiO_2$ nanoparticles have average size of no more than 21 nm and at least 90% of the surface of the polyacrylonitrile fibers is covered by the $TiO_2$ nanoparticles; and
wherein the air treatment system is configured to pump the vehicular traffic pollution through the cyclone and then thorough the particle filter where it is irradiated by the UV source prior to exhausting purified air.

2. The system of claim 1, wherein the particle filter (6) comprises nanoparticles of titanium dioxide-titanium(IV) oxide anatase.

3. The system of claim 1, wherein at least 90% of the surface of the particle filter (6) is covered by the $TiO_2$ nanoparticles.

4. The system of claim 1, wherein the vehicular traffic pollution is air pumped from a traffic intersection.

5. The system of claim 1, wherein the pole is a traffic signal.

6. The system of claim 1, wherein said air treatment system is entirely contained within the pole.

7. The system of claim 1, wherein the UV source is sunlight.

8. The system of claim 1, wherein the filter comprises polyacrylonitrile fibers coated with a layer of the nanoparticles applied by contacting the polyacrylonitrile fibers with a solution of an alcohol and the anatase $TiO_2$ nanoparticles under sonication and then drying the polyacrylonitrile fibers to produce a filter.

9. The system of claim 1, wherein the filter comprises polyacrylonitrile fibers coated with a layer of the nanoparticles applied by contacting the polyacrylonitrile fibers with a solution of isoamyl alcohol containing 5 to 15 mg/mL anatase $TiO_2$ nanoparticles under sonication and then drying the polyacrylonitrile fibers to produce a filter; wherein said polyacrylonitrile fibers have an average molecular weight ranging from 125 to 175 kDa; and have a polydispersity index ranging from 1.05 to 1.15.

\* \* \* \* \*